July 23, 1963    A. P. BALLY    3,098,705
PROCESS FOR REMOVING CARBONYL SULFIDE FROM PETROLEUM GASES
Filed Dec. 5, 1960
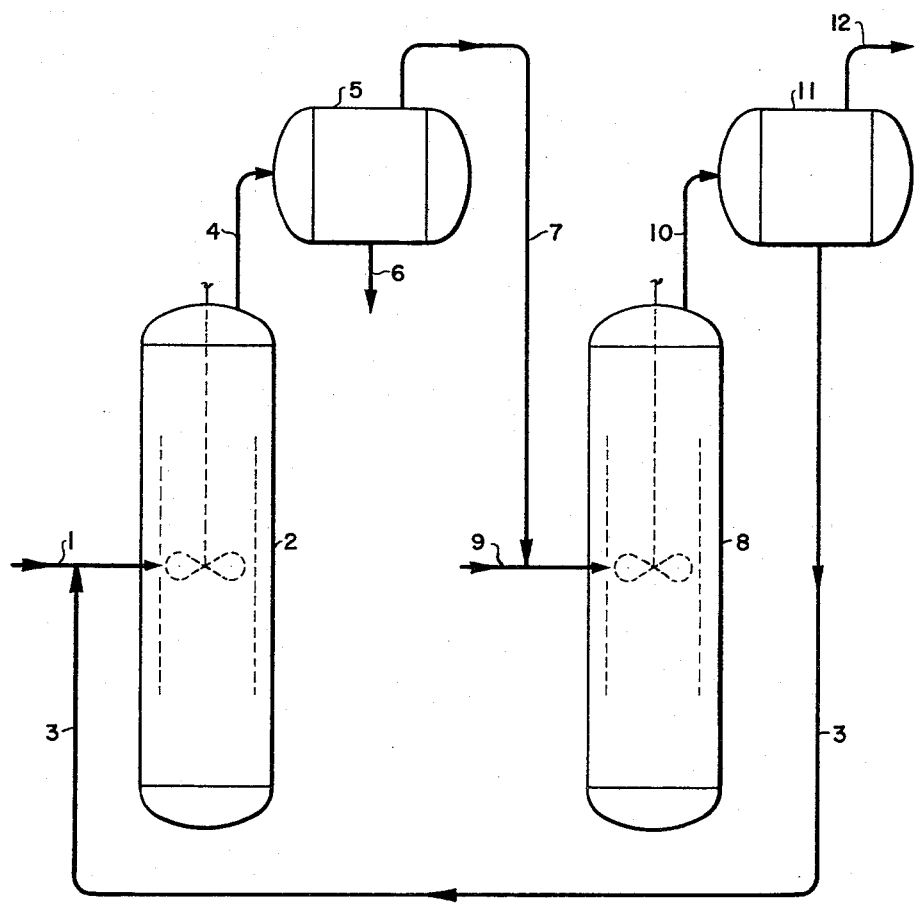
INVENTOR:
ADRIANUS P. BALLY
BY: Robert C. Clement
HIS ATTORNEY 3,098,705
PROCESS FOR REMOVING CARBONYL SULFIDE FROM PETROLEUM GASES
Adrianus P. Bally, The Hague, Netherlands, assignor to Shell Oil Company, New York, N.Y., a corporation of Delaware
Filed Dec. 5, 1960, Ser. No. 73,736
5 Claims. (Cl. 23—3)

When petroleum hydrocarbon gases containing sulfur are produced by cracking or other refinery operations, hydrogen sulfide and carbonyl sulfide are formed, which, when the cracked products are fractionated, chiefly remain in the fractions containing ethane, ethylene, propane, propylene, butane and butylene. The presence of these sulfur compounds renders the cracked products malodorous and corrosive, and is harmful when they are further processed to, for example, solvents such as alcohols. Moreover, when storing the cracked products which are already completely freed from hydrogen sulfide, the presence of small quantities of water results in the formation by hydrolysis of carbon dioxide and hydrogen sulfide from the carbonyl sulfide, the hydrogen sulfide being oxidized by traces of oxygen to free sulfur which can only be removed with great difficulty.

The sulfur compounds also occur in industrial gases such as water gas, coke-oven gas, producer gas, and illuminating gas, and their presence therein is just as undesirable as in the cracked products.

Various processes are used for the removal of hydrogen sulfide. For example, hydrocarbons are washed with alkali metal hydroxide solution in order to remove hydrogen sulfide. Our worker in this field has disclosed a process in which liquid hydrocarbons containing hydrogen sulfide and/or other acidic impurities are treated with water-soluble, basic-reacting amines, such as ethanol amines, polyethylene- and polypropylene-amines, and aminopropanediols. According to other workers, however, amines cannot be used satisfactorily in those cases where the hydrocarbons contain carbonyl sulfide, carbon disulfide and/or aldehydes, since these compounds react with the amines to form stable, neutral nitrogen compounds which have no capacity for taking up any further amounts of hydrogen sulfide. Moreover, the original amines cannot be recovered from the reaction product by simple heating. However, an aqueous solution of diethanolamine has been said to be an exception in that it can be used for the removal of hydrogen sulfide from liquid hydrocarbons, any carbonyl sulfide present not being bound. The diethanolamine solution containing hydrogen sulfide can be regenerated by heating. The latter process has the drawback, however, that starting materials containing carbonyl sulfide in addition to hydrogen sulfide, have to be subjected to a separate after-treatment to remove the carbonyl sulfide. Such an after-treatment may be carried out for hydrocarbons by a two-stage process, in which a hydrocarbon already freed from hydrogen sulfide is first contacted with a substantially anhydrous alcoholic solution of alkali metal hydroxide, after which the hydrogen sulfide formed from the carbonyl sulfide is removed from the treated hydrocarbon by means of an aqueous alkali metal hydroxide solution. A drawback of this process is that a large quantity of alkali metal hydroxide is consumed which cannot be regenerated in a simple manner.

Another process for the removal of carbonyl sulfide from normally gaseous petroleum hydrocarbons comprises intensely contacting these gases in a liquid state with an aqueous diethanolamine solution.

Contrary to expectation, it has now been found that the use of an intimate contacting, such as intense mixing, makes it possible to remove carbonyl sulfide completely or substantially completely from hydrocarbon gases even in the vapor state by means of an aqueous solution of dipropanolamines and that the spent liquid obtained in this treatment can be regenerated in a simple manner at a substantial saving in recovery costs compared with processes using diethanolamine solutions.

The invention therefore relates to a process for the production of hydrocarbon gases completely or substantially completely freed from carbonyl sulfide, by treating the vaporous gases which contain carbonyl sulfide with an aqueous solution of di(isopropanol) amine, the gases containing carbonyl sulfide being intensely mixed with the aqueous amine solution for at least 15 seconds at a temperature of 0–70° C., and the amine phase being subsequently separated, the process being characterized in that the gases are treated in the gaseous state and not in liquid (condensed) condition.

Di(isopropanol)amine in particular has been found to have a larger absorption capacity with respect to acidic compounds, such as hydrogen sulfide and carbon dioxide, than diethanolamine, so that a smaller amount of absorption liquid is required. Consequently, regeneration requirements are correspondingly reduced and purification of the hydrocarbons is effected to an unexpectedly great extent. The capacity of the di(isopropanol)amine to absorb $H_2S$ to a greater extent is of vital importance to the operation of the present process, which depends in part upon the conversion of carbonyl sulfide to $H_2S$ in the amine solution. A practical test showed that from a certain gas 1 mol of hydrogen sulfide+carbon dioxide may be absorbed per 5 mols of diethanolamine whereas only 3 mols of di(isopropanol)amine were required under otherwise comparable conditions. When mixing the phase containing carbonyl sulfide with the di(isopropanol)amine phase a quantity of carbonyl sulfide passes into the latter phase in which it is presumably very rapidly hydrolyzed to hydrogen sulfide and carbon dioxide which are bound by the basic-reacting amine. As a result, the amount of carbonyl sulfide in the di(isopropanol)amine phase is reduced and a further quantity of carbonyl sulfide can again pass into this phase from the phase to be treated. The time required for the passage of the carbonyl sulfide from one phase to the other chiefly depends on the intensity of the contact between the two phases. A good contact is ensured in the first place by mixing the two phases intimately, but the ratio of the quantities of the two phases is an additional factor.

The more intense the mixing, the shorter may be the duration of the contact. With the equipment at present available, however, it is practically impossible to reduce the duration to less than 15 seconds, since this would involve such a great mixing energy that the present process would become economically unattractive when used on a practical scale, and also because the equivalent required to supply such an energy is very large and costly. When used on a laboratory scale it has been found that the present process can be carried out in approximately 2 seconds with a colloid mill. In this case, however, the mechanical power transferred by the stirring element to the mixture of the two phases is approximately 150 kw. per cubic meter of mixture.

From the technical and economical point of view good results are usually obtained when the mixing is such that the mechanical energy transferred by the stirring elements to the mixture of the two phases is from 0.2 to 1.5 kw. per cubic meter of mixture. In this case the duration of the contact will usually not exceed 30 minutes (preferably 5–20 minutes). When the phase to be treated contains a large amount of carbonyl sulfide, the duration of the contact between the two phases will be longer and/or it will be necessary to stir more intensely than when purifying a phase containing less carbonyl sulfide. Mixers in which the process may be very suitably carried out, especially for the treatment of liquids, are, for example, propeller mixers, and centrifugal mixers, such as the turbo-mixer. For treating gases, an apparatus is preferably used by which the gas may be finely distributed in the treating liquid. Very good results are obtained with columns provided with bubble trays, as well as with columns filled with packing materials, such as Raschig rings.

When treating gases the weight ratio used of the di(isopropanol) amine phase to the gas phase to be treated is highly dependent on the content of hydrogen sulfide and carbonyl sulfide in these gases. In practice this ratio will generally be between 0.1 and 20 and usually between 2 and 10.

It is advantageous to contact the gases to be treated with the di(isopropanol)amine solution at elevated pressure (preferably 5–30 atmospheres). In this case the smaller gas volume will make it possible to use a contact apparatus of smaller dimensions. A second advantage is that the passage of the hydrogen sulfide and carbonyl sulfide into the amine phase is improved by the increased partial pressure of these compounds in the gas.

When treating liquids it is desirable that the volume ratio of the di(isopropanol)amine phase to the liquid phase to be treated is at least 0.1. In addition, the aim is to ensure that after the treatment the minimum amount of the aqueous di(isopropanol)amine solution is dispersed in the liquid. In order to accomplish this the ratio by volume of the di(isopropanol)amine phase to the liquid to be treated during mixing should be maintained at not less than 0.25 and preferably at approximately 0.5, since under these conditions the di(isopropanol)amine phase is continuous and only small quantities of the treated liquid are entrained in the di(isopropanol)amine phase.

The concentration of the aqueous di(isopropanol)amine solution may vary within wide limits. The di(isopropanol)amine content in the solution is generally between 10 and 60% by weight, and particularly between 15 and 30% by weight. The results of the present process may be improved still further by adding to the aqueous di(isopropanol)amine solution one or more compounds such as triethylene glycol or 2-methoxy ethanol, which promote the passage of carbonyl sulfide from the gas or the liquid into this solution.

The temperature at which the process according to the invention is carried out is generally in the range of from 0 to 70° C., and preferably from 15° C. to 50° C.

When the ethane, propane or butane fraction obtained from a cracking plant is treated according to the process of the present invention, this is generally done at superatmospheric pressure since in many cases these fractions are already present at the refinery in the liquid state, and are also further processed in this state. When treating, for example, liquid propane according to the invention, the pressure is usually approximately 25 atm. abs., and when treating butane it is generally approximately 10 atm. abs.

The process of the present invention is preferably carried out in two stages on the countercurrent principle. If the process is carried out in mixers and settling vessels, the phase which contains the carbonyl sulfide and is to be treated is mixed in the first stage with the di(isopropanol)-amine solution which is already partly spent, the two phases are separated in a settling space and the phase to be further treated is then mixed with fresh and/or regenerated di(isopropanol)amine solution to complete the treatment. The partly spent di(isopropanol)amine solution obtained in the latter stage may be again mixed with untreated gas and/or untreated liquid.

The process can, of course, also be carried out in more than two stages, in which case operations are preferably carried out countercurrently in a column. When applying the process in one stage, there is a danger that not all the carbonyl sulfide passes into the di(isopropanol)amine phase, or that not all the hydrogen sulfide is bound by the di(isopropanol)amine, and remains in or returns to the treated phase. When operating in more than one stage, the above-described conditions of intense mixing, volume ratio of the two phases, and pressure optionally applied, and concentration of the di(isopropanol)amine solution, are generally maintained in each stage. In a multi-stage process it may be beneficial to use a temperature gradient, the temperature being highest in the stage in which the phase to be treated is mixed with di(isopropanol)amine solution for the first time.

The wholly or partly spent amine solution may be regenerated in a very simple manner, after which it is again suitable for use in the process. The regeneration may be effected, for example, by heating the amine solution to a temperature of from 70° C. to 130° C., preferably from 100° C. to 120° C., as a result of which the components absorbed from the gases treated and/or the hydrolysis products formed are expelled again. This treatment may be very suitably carried out by indirect low-pressure steam heating of the solution to be regenerated, whereby the hydrogen sulfide, carbon dioxide, etc. absorbed are effectively evaporated.

The carbonyl sulfide sulfur content in the gases and/or liquids may be reduced to less than 10% of the original content by using the process of the invention, the content of hydrogen sulfide in this case usually being 0.005% or less.

The accompanying drawing diagrammatically shows by way of example the manner in which a liquid containing carbonyl sulfide may be treated according to the invention in a two-stage process on the countercurrent principle. The liquid to be treated enters through line 1 into propeller mixer 2, where it is stirred with already partly spent di(isopropanol)amine solution supplied through line 3. After intense stirring the mixture is led off through line 4 into settling tank 5 whence the spent di(isopropanol)amine solution is led off through line 6 for regeneration, the liquid to be further treated being passed through line 7 into propeller mixer 8 where it is intensely stirred with fresh or regenerated di(isopropanol)amine solution supplied through line 9. The mixture is passed through line 10 to settling tank 11, whence the liquid which is completely or substantially completely freed from carbonyl sulfide and hydrogen sulfide is withdrawn through line 12, the partly spent di(isopropanol)amine solution being pumped through line 3 to propeller mixer 2 where it is stirred with the liquid still untreated. When treating a gas containing carbonyl sulfide it is introduced into the propeller mixer through an annular line which is provided with openings and is fitted underneath the propeller. In this case the di(isopropanol)amine solution is supplied in the same manner as shown in the drawing for the treatment of a liquid, except that it is introduced at the bottom of the propeller mixer. The treatment of gases may, however, generally be carried out in a simple manner in a column provided with bubble trays, such as bubble cap trays.

The invention will be further elucidated with reference to the following example.

*Example*

A gas consisting of 12% by volume of methane, 15% by volume of ethane+ethylene, 15% by volume of propane+propylene, apprixomately 58% by volume of hydrogen, as well as 0.05% by volume of hydrogen sulfide and 50 p.p.m. of carbonyl sulfide was continuously introduced into the bottom of a column having a diameter of 1.8 m. and a length of 12 m. and provided with 15 bubble cap trays, at a temperature of 40° C. and a pressure of 15 atm.

A 10% aqueous solution of a technical di(isopropanol)amine consisting of 94% by weight of di(isopropanol)amine, 4% by weight of monopropanolamine and 2% by weight of tripropanolamine was continuously introduced near the top.

The ratio by volume of the gas introduced to the di(isopropanol)amine solution was 900:1, an overall quantity of 350 tons of gas and 60 tons of di(isopropanol)amine solution being passed into the column for twenty-four hours.

The gas discharged at the top of the column had a hydrogen sulfide content of less than 0.0015% by volume, the carbonyl sulfide content being below 0.5 p.p.m.

This example which was carried out on a technical scale shows that practically all the carbonyl sulfide, viz. 99%, and approximately 97% of the hydrogen sulfide was removed from the gas.

With the use of an aqueous diethanolamine solution, the conditions remaining otherwise unchanged, 80% of the carbonyl sulfide and 90% of the hydrogen sulfide are removed from the gas.

The di(isopropanol)amine solution running off the absorption column was continuously supplied to the top of a regeneration column at a slight superatmospheric pressure (0.5 atm.). This column had a diameter of 0.9 m. and a height of 15 m. and contained 16 bubble cap trays, the bottom temperature being maintained at 108° C. by means of indirect heating with steam. The di(isopropanol)amine solution running off the bottom was recycled to the process after being cooled by means of heat exchangers. The hydrogen sulfide concentration of the stripped gas passing off at the top of the regeneration column is such that it can be processed without any further treatment in a surfur recovery plant.

I claim as my invention:

1. The method of removing carbonyl sulfide from admixture with normally gaseous hydrocarbons which comprises intimately contacting said hydrocarbons in vapor phase with an aqueous solution consisting essentially of 10–60% by weight di(isopropanol)amine at a temperature of 0–70° C. for ¼–30 minutes, whereby carbonyl sulfide is selectively extracted from the hydrocarbon phase by the aqueous solution, and separating the hydrocarbon phase essentially free of carbonyl sulfide.

2. The method of removing carbonyl sulfide from admixture with $C_1$–$C_4$ aliphatic hydrocarbons which comprises intimately contacting the hydrocarbons in gaseous phase with an aqueous solution consisting essentially of 15–30% by weight of di(isopropanol)amine at a temperature of 15–50° C. for 5–20 minutes, whereby carbonyl sulfide is selectively extracted from the hydrocarbon phase by the aqueous solution and separating the hydrocarbon phase essentially free of carbonyl sulfide.

3. A method according to claim 2 wherein the hydrocarbons in gaseous phase are subjected to a pressure of 5–30 atmospheres during contacting with the di(isopropanol)amine solution.

4. A method according to claim 2 wherein contact is effected between a rising gaseous hydrocarbon stream against a descending aqueous di(isopropanol)amine solution in a vertically positioned tower fitted with bubble cap trays.

5. A method according to claim 4 wherein the weight ratio of di(isopropanol)amine phase to hydrocarbon phase is between about 0.1 and about 20.0.

References Cited in the file of this patent

FOREIGN PATENTS

| | | |
|---|---|---|
| 461,001 | Great Britain | Feb. 2, 1937 |
| 803,043 | Great Britain | Oct. 15, 1958 |